(12) United States Patent
Jolley

(10) Patent No.: US 6,981,705 B1
(45) Date of Patent: Jan. 3, 2006

(54) SKI APPARATUS FOR TRANSPORTING CARGO

(76) Inventor: Stephen C. Jolley, 375 Columbus Ave., Apt. 304, Boston, MA (US) 02116

( * ) Notice: Subject to any disclaimer, the term of this patent is extended or adjusted under 35 U.S.C. 154(b) by 102 days.

(21) Appl. No.: 10/634,198

(22) Filed: Aug. 6, 2003

(51) Int. Cl.
*A63C 17/18* (2006.01)

(52) U.S. Cl. ............... 280/7.12; 280/13; 280/28.12

(58) Field of Classification Search .......... 280/7.1, 280/7.12, 7.14, 13, 14, 14.1, 28.12, 28.16, 280/11, 7.15, 845, 7.2
See application file for complete search history.

(56) References Cited

U.S. PATENT DOCUMENTS

| 970,874 | A | * | 9/1910 | Beffel ...................... 280/13 |
| 1,024,792 | A | * | 4/1912 | Leith ....................... 280/13 |
| 1,068,120 | A | * | 7/1913 | Franssson .................. 280/13 |
| 2,081,024 | A | * | 5/1937 | Turner ..................... 280/13 |
| 2,314,293 | A | | 3/1943 | Tyndall |
| 2,316,456 | A | | 4/1943 | Robes, Jr. |
| 2,352,966 | A | * | 7/1944 | Morando .................... 280/8 |
| 2,367,271 | A | | 1/1945 | Habostad |
| 2,443,699 | A | * | 6/1948 | Swain ...................... 280/13 |
| 2,523,950 | A | * | 9/1950 | Golubics ................... 280/13 |
| 2,530,240 | A | * | 11/1950 | Graham .................... 280/13 |
| 4,251,085 | A | * | 2/1981 | Lageer et al. ............. 280/10 |
| 5,340,153 | A | | 8/1994 | Parker |
| 5,407,217 | A | * | 4/1995 | Lambert et al. ........... 280/10 |
| 5,427,390 | A | * | 6/1995 | Duncan et al. ............ 280/8 |
| 5,588,569 | A | | 12/1996 | Mitomi et al. |
| 6,708,989 | B1 | * | 3/2004 | Braun .................... 280/7.12 |

* cited by examiner

Primary Examiner—Christopher P. Ellis
Assistant Examiner—Kelly E Campbell

(57) ABSTRACT

An apparatus for transporting cargo over snowy and icy surfaces includes a plurality of elongate ski members and a plurality of clamping members connected to the respective top surfaces of the plurality of ski members. The plurality of clamping members are movable between forward and rearward positions for receiving a bottom portion of a cargo and maintaining same in a substantially stable position during transportation. The plurality of clamping members include a plurality of support members extending upwardly from the respective top surfaces of the plurality of ski members and each have an elongate slot formed therethrough for allowing the plurality of clamping members to move between forward and rearward positions when a cargo is tilted forwardly and rearwardly, respectively.

12 Claims, 2 Drawing Sheets

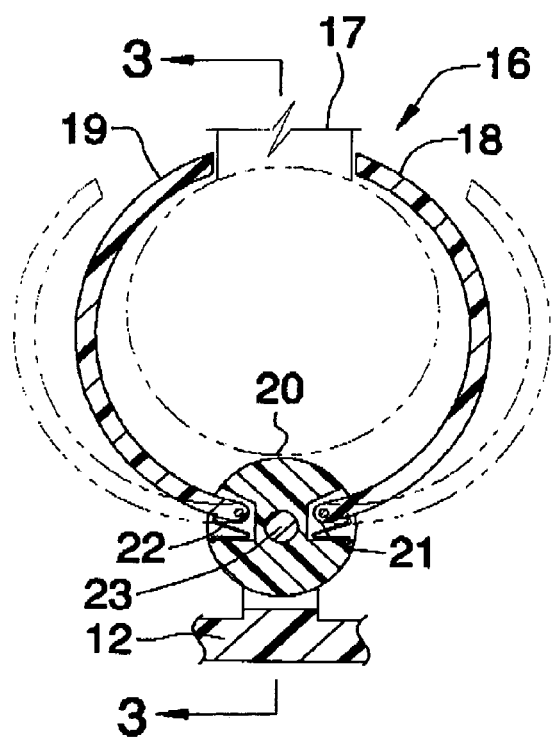
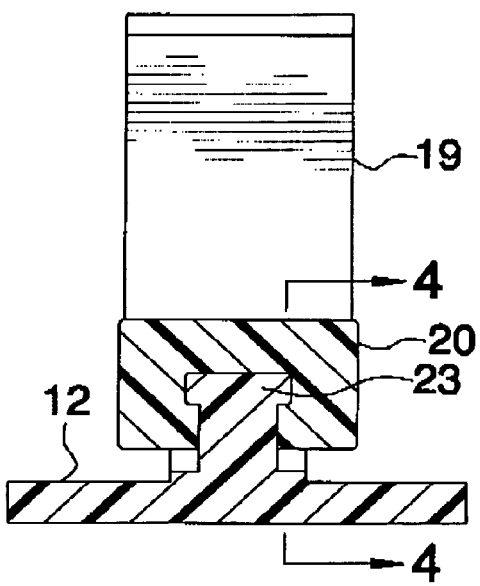
FIG.2  FIG.3
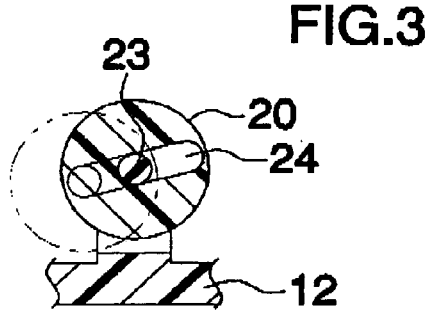
FIG.4

SKI APPARATUS FOR TRANSPORTING CARGO

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a ski apparatus for transporting cargo and, more particularly, to a ski apparatus including a plurality of pivotable clamping members for allowing cargo to be positioned between tilted and non-tilted positions.

2. Prior Art

Many parts of the continent are covered with snow during a significant portion of the year. As such, it is often difficult to travel, especially walk, on such cold terrain without the aid of special devices such as skis or snowshoes. Unfortunately, even with such helpful devices, it is difficult to travel long distances, especially if the traveler is carrying heavy cargo or packs. Such packs are often worn around the traveler's shoulders or positioned on their backs. When such packs are carried for a significant distance, travelers often develop fatigue and soreness throughout their bodies.

It is often not practical to drag such packs along the snow or ice because the packs may not be waterproof or may become damaged over extended usage. Packs that are equipped with rollers are also difficult to transport because such rollers do not function effectively on snow or ice.

More specifically, skiers must carry a great deal of equipment to the slopes. In addition to skis, they must also carry boots and poles. At certain resorts, skiers must carry all of their equipment for a considerable distance before reaching the slopes. Carrying skis and related equipment can be tiresome and in many cases hazardous to the skier and others. It is therefore highly desirable for a traveler such as a skier, for example, to have an apparatus that will safely carry their cargo while reducing the effort necessary to carry the same.

BRIEF SUMMARY OF THE INVENTION

In view of the foregoing background, it is therefore an object of the present invention to provide a ski apparatus for carrying cargo through snow or ice. These and other objects, features, and advantages of the invention are provided by an apparatus for transporting cargo over snowy and icy surfaces, which includes a plurality of elongate ski members each having front and rear end portions and a substantially planar top surface, respectively. The apparatus further includes a plurality of clamping members connected to the respective top surfaces of the plurality of ski members.

The plurality of clamping members are movable between forward and rearward positions for receiving a bottom portion of a cargo and maintaining same in a substantially stable position during transportation. The plurality of clamping members include a plurality of support members extending upwardly from the respective top surfaces of the plurality of ski members and each have an elongate slot formed therethrough for allowing the plurality of clamping members to move between forward and rearward positions when a cargo is tilted forwardly and rearwardly, respectively.

A plurality of adjustable arms each has a lower end portion connected to the plurality of support members and are movable between open and closed positions. The plurality of adjustable arms have preferably substantially arcuate shapes. A plurality of springs are preferably connected to respective lower end portions of the plurality of arms. The plurality of ski members may include adjustable rear end portions respectively so that a length of the plurality of ski members can be telescopically adjusted, as desired by a user. Accordingly, the plurality ski members preferably include a female portion and a male portion telescopically engageable therewith and for adjusting a length of the plurality of ski members, respectively.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is an enlarged cross-sectional view taken along line 2—2 in FIG. 1;

FIG. 3 is an enlarged cross-sectional view taken along line 3—3 in FIG. 2; and

FIG. 4 is a cross-sectional view taken along line 4—4 in FIG. 3.

DETAILED DESCRIPTION OF THE INVENTION

Figure 1:
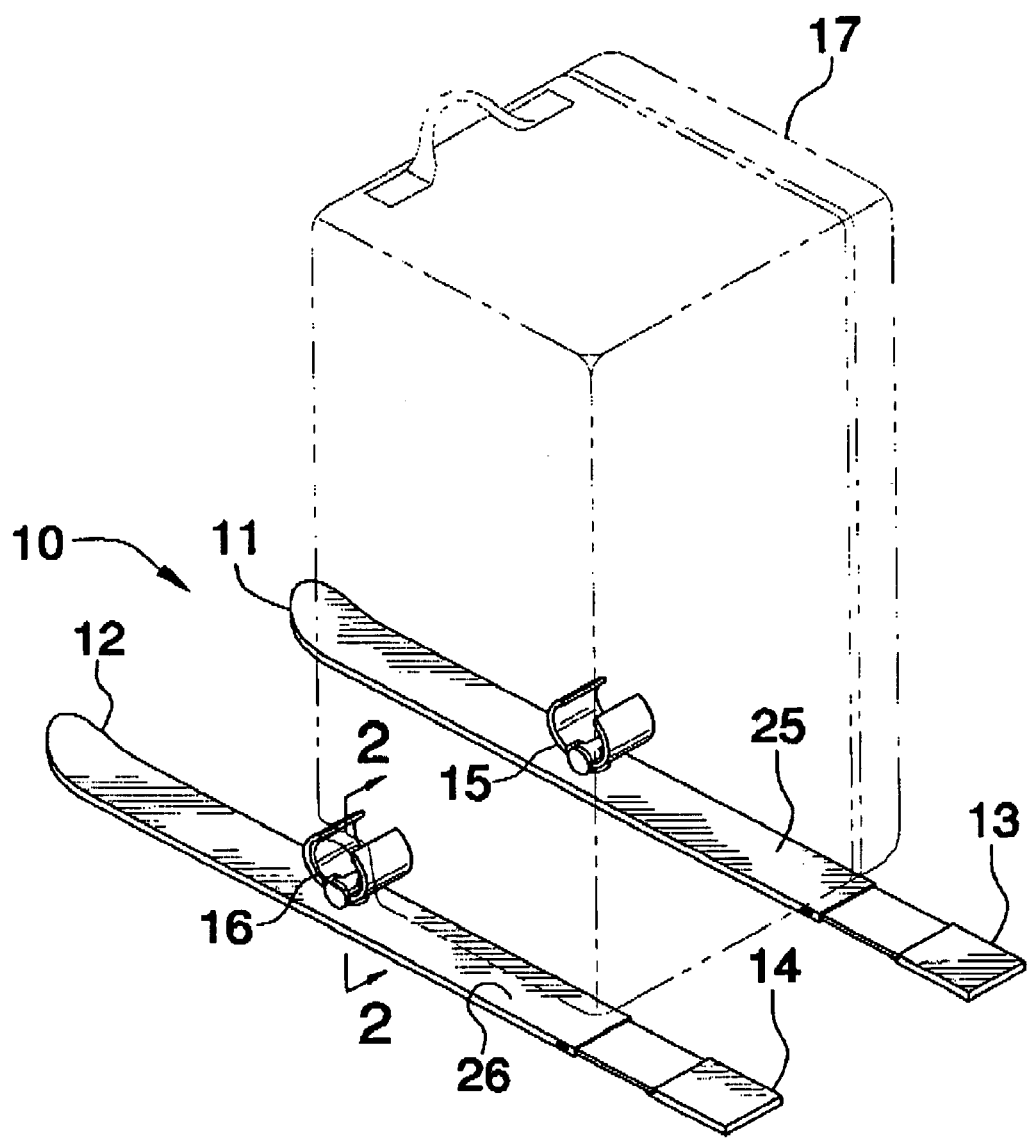
FIG. 1 is a perspective view showing a ski apparatus for carrying cargo through the snow, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

The apparatus of this invention is referred to generally in FIG. 1 by the reference numeral 10 and is intended to provide a ski apparatus for transporting cargo over snow. It should be understood that the apparatus 10 may be used to transport various cargo and, therefore, should not be construed as limited to transporting only cargo with wheel supports.

The apparatus 10 includes a pair of conventional ski members 11, 12 having substantially planar top and bottom surfaces. Each ski member 11, 12 includes a clamping member 15, 16 attached to the top surface thereof, respectively. Such clamping members may be disposed generally towards a front end portion of the ski member 11, 12. Of course, the clamping members 15, 16 may also be positioned generally medially between the front and rear end portions of the ski members 11, 12 depending upon the size of the cargo 17 that is being transported. For example, if the cargo has a short handle, the clamping members 15, 16 are preferably disposed adjacent the front end portion of the ski members 11, 12 so that when a user is pulling the cargo 17, the front end portions of the ski members 11, 12 do not obstruct the user's foot path.

Each ski member 11, 12 further includes a telescopically adjustable rear end portion. In particular, such ski members include a female end portion 25, 26, respectively, and a male end portion 13, 14, respectively. Such male end portions are adjustably engageable with the female end portions 13, 14 so that the length of the ski members 11, 12 can be shortened or lengthened, as desired by a user. Accordingly, the length of the ski members 11, 12 may be extended if the cargo extends beyond the rear end portions of the ski members 11, 12, and visa-versa.

Now referring to FIGS. 2–4, a cross-sectional view of clamping member 16 is shown and it should be understood that clamping member 17 includes a substantially similar structure and functions in a substantially similar manner. Therefore, only clamping member 16 will be described hereinbelow. Such a clamping member 16 includes a support member 20 having a bottom surface connected to ski member 12 and extending upwardly therefrom. The support member 20 has a generally cylindrical shape and extends substantially across the width of the ski member 16.

A pair of oppositely spaced openings are formed at substantially front and rear portions of support member 20 and house a pair of springs 21, 22 therein, respectively. Such springs are connected to a bottom end portion of a pair of mandibles or engaging members 18, 19, which extend upwardly therefrom in a substantially arcuate path. Thus, the engaging members 18, 19 have substantially arcuate shapes and converge upwardly from the support member 20 so that they can securely maintain a bottom portion such as a wheel, for example, of cargo 17 therebetween. Such engaging members 18, 19 are movable to an open position and will automatically return to their closed (relaxed) position when they are released.

A shaft member 23 integral with the ski member 11 is disposed within support member 20 wherein same rotates thereabout during operating conditions. Moreover, clamping member 16 is movable between forward and rearward positions when the cargo is tilted forwardly and rearwardly, respectively. In particular, an elongate slot 24 is formed within a portion of support member 20 for defining a path through which shaft member 23 is movable for allowing the clamping member 16 to tilt or swivel, as perhaps best shown by the broken lines in FIG. 4. Such a movement may be similar to a swiveling ball joint, for example, as well known in the industry. Advantageously, the clamping member 16 is able to effectively maintain engagement with a cargo 17 wheel portion, even when the cargo 17 is tilted forwardly during operating conditions.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for transporting cargo over snowy and icy surfaces, said apparatus comprising:
    a plurality of elongate ski members each having front and rear end portions and a substantially planar top surface respectively;
    a plurality of clamping members connected to said respective top surfaces of said plurality of ski members, said plurality of clamping members being movable between forward and rearward positions and for receiving a bottom portion of a cargo and maintaining same in a substantially stable position during transportation;
    wherein said plurality of clamping members comprise
        a plurality of support members extending upwardly from said respective top surfaces of said plurality of ski members,
        a plurality of adjustable arms each having a non-linear lower end portion connected to said plurality of support members and being movable between open and closed positions,
        wherein each said adjustable arms is independently adaptable along a path registered with a corresponding one of said ski members such that one said adjustable arm can be articulated while another said adjustable arms juxtaposed adjacent thereto can be maintained at a static position;
        each said clamping member includes a pair of springs such that each said adjustable arm cooperates with one said springs and is independently adaptable between raised and lowered positions as a corresponding one of said springs is resiliently compressed along a vertical plane;
        wherein each said support member is coextensive and includes a centrally disposed longitudinal axis traversing a longitudinal length of said ski members; and
    means for swiveling said clamping members for allowing said clamping members to maintain contact with the cargo when the cargo is tilted forwardly and rearwardly respectively, said swiveling means comprising a shaft member integral with said top surface of said ski member and disposed within each said support member wherein each said support member rotates thereabout.

2. The apparatus of claim 1, wherein said plurality of adjustable arms have substantially arcuate shapes.

3. The apparatus of claim 1, wherein said plurality of support members each have an elongate slot formed therethrough and for allowing said plurality of clamping members to move between forward and rearward positions when a cargo is tilted forwardly and rearwardly respectively.

4. The apparatus of claim 1, wherein said plurality ski of members comprise adjustable rear end portions respectively so that a length of said plurality of ski members can be telescopically adjusted as desired by a user.

5. The apparatus of claim 1, wherein said plurality ski of members comprise a female portion and a male portion telescopically engageable therewith and for adjusting a length of said plurality of ski members respectively.

6. An apparatus for transporting cargo over snowy and icy surfaces, said apparatus comprising:
    a plurality of elongate ski members each having front and rear end portions and a substantially planar top surface respectively; and
    a plurality of clamping members connected to said respective top surfaces of said plurality of ski members, said plurality of clamping members being movable between forward and rearward positions and for receiving a bottom portion of a cargo and maintaining same in a substantially stable position during transportation, said plurality of clamping members including
        a plurality of support members extending upwardly from said respective top surfaces of said plurality of ski members, said support members having a generally cylindrical shape and extending transversely across a width of said elongate ski members, and a plurality of adjustable arms each having a non-linear lower end portion connected to said plurality of support members and being movable between open and closed positions;

wherein each said adjustable arms is independently adaptable along a path registered with a corresponding one of said ski members such that one said adjustable arms can be articulated while another said adjustable arms juxtaposed adjacent thereto can be maintained at a static position, said plurality of adjustable arms having substantially arcuate shapes;

each said clamping member includes a pair of springs such that each said adjustable arm cooperates with one said springs and is independently adaptable between raised and lowered positions as a corresponding one of said springs is resiliently compressed along a vertical plane;

wherein each said support member is coextensive and includes a centrally disposed longitudinal axis traversing a longitudinal length of said ski members; and means for swiveling said clamping members and for allowing said clamping members to maintain contact with the cargo when the cargo is tilted forwardly and rearwardly respectively, said swiveling means comprising a shaft member integral with said top surface of said ski member and disposed within each said support member wherein each said support member rotates thereabout.

7. The apparatus of claim 6, wherein said plurality of support members each have an elongate slot formed therethrough and for allowing said plurality of clamping members to move between forward and rearward positions when a cargo is tilted forwardly and rearwardly respectively.

8. The apparatus of claim 6, wherein said plurality of ski members comprise adjustable rear end portions respectively so that a length of said plurality of ski members can be telescopically adjusted as desired by a user.

9. The apparatus of claim 6, wherein said plurality of ski members comprise
a female portion and a male portion telescopically engageable therewith and for adjusting a length of said plurality of ski members respectively.

10. An apparatus for transporting cargo over snowy and icy surfaces, said apparatus comprising:
a plurality of elongate ski members each having front and rear end portions and a substantially planar top surface respectively;
a plurality of clamping members connected to said respective top surfaces of said plurality of ski members, said plurality of clamping members being movable between forward and rearward positions and for receiving a bottom portion of a cargo and maintaining same in a substantially stable position during transportation, said plurality of clamping members including a plurality of support members extending upwardly from said respective top surfaces of said plurality of ski members, said plurality of support members each have an elongate slot formed therethrough and for allowing said plurality of clamping members to move between forward and rearward positions when a cargo is tilted forwardly and rearwardly respectively, said support members having a generally cylindrical shape and extending transversely across a width of said elongate ski members, and a plurality of adjustable arms each having a non-linear lower end portion connected to said plurality of support members and being movable between open and closed positions;

wherein each said adjustable arms is independently adaptable along a path registered with a corresponding one of said ski members such that one said adjustable arm can be articulated while another said adjustable arms juxtaposed adjacent thereto can be maintained at a static position, said plurality of adjustable arms having substantially arcuate shapes; and each said clamping member includes a pair of springs such that each said adjustable arm cooperates with one said springs and is independently adaptable between raised and lowered positions as a corresponding one of said springs is resiliently compressed along a vertical plane;

wherein each said support member is coextensive and includes a centrally disposed longitudinal axis traversing a longitudinal length of said ski members; and means for swiveling said clamping members and for allowing said clamping members to maintain contact with the cargo when the cargo is tilted forwardly and rearwardly respectively, said swiveling means comprising a shaft member integral with said too surface of said ski member and disposed within each said support member wherein each said support member rotates thereabout.

11. The apparatus of claim 10, wherein said plurality of ski members comprise adjustable rear end portions respectively so that a length of said plurality of ski members can be telescopically adjusted as desired by a user.

12. The apparatus of claim 10, wherein said plurality of ski members comprise
a female portion and a male portion telescopically engageable therewith and for adjusting a length of said plurality of ski members respectively.

* * * * *